United States Patent [19]

Lowery

[11] Patent Number: 5,564,766
[45] Date of Patent: Oct. 15, 1996

[54] J-HOOK FOR TOWING VEHICLES

[75] Inventor: Tommy A. Lowery, Wildwood, Ga.

[73] Assignee: Columbus McKinnon Corporation, Amherst, N.Y.

[21] Appl. No.: 370,098

[22] Filed: Jan. 9, 1995

[51] Int. Cl.⁶ .................................................... B66C 1/24
[52] U.S. Cl. ................................................ 294/82.1; 280/480
[58] Field of Search .................... 294/26, 82.1, 82.11, 294/82.17, 74; 280/186, 480; 24/698.1, 698.2

[56]  References Cited

U.S. PATENT DOCUMENTS

| | | |
|---|---|---|
| 336,687 | 2/1886 | Barr . |
| 497,936 | 5/1893 | Williams .............................. 24/698.1 |
| 1,459,816 | 6/1923 | Bemis . |
| 2,159,756 | 5/1939 | Bamberger .............................. 280/480 |
| 2,369,455 | 2/1945 | Grause .................................... 294/82.1 |
| 2,646,306 | 7/1953 | Foss ........................................ 294/82 |
| 4,068,467 | 1/1978 | Schreyer et al. ...................... 294/82.11 |
| 4,171,842 | 10/1979 | Tolle ...................................... 294/82 R |
| 4,257,638 | 3/1981 | Koval .................................... 294/82 R |
| 4,556,246 | 12/1985 | Millington ........................... 294/82.11 |
| 4,622,724 | 11/1986 | Dupre .................................... 294/82.11 |
| 4,785,509 | 11/1988 | Fisher .................................... 24/698.1 |
| 4,831,692 | 5/1989 | Chuan ................................... 24/698.1 |

*Primary Examiner*—Dean Kramer
*Attorney, Agent, or Firm*—Bean, Kauffman & Spencer

[57]  ABSTRACT

A J-hook designed for use in towing vehicles is forged of micro-alloy steel and has a T-shaped cross-section throughout a load bearing portion thereof and an enlarged tip. The disclosed J-hook is much stronger than prior art towing J-hooks without significant increase in overall weight.

6 Claims, 2 Drawing Sheets

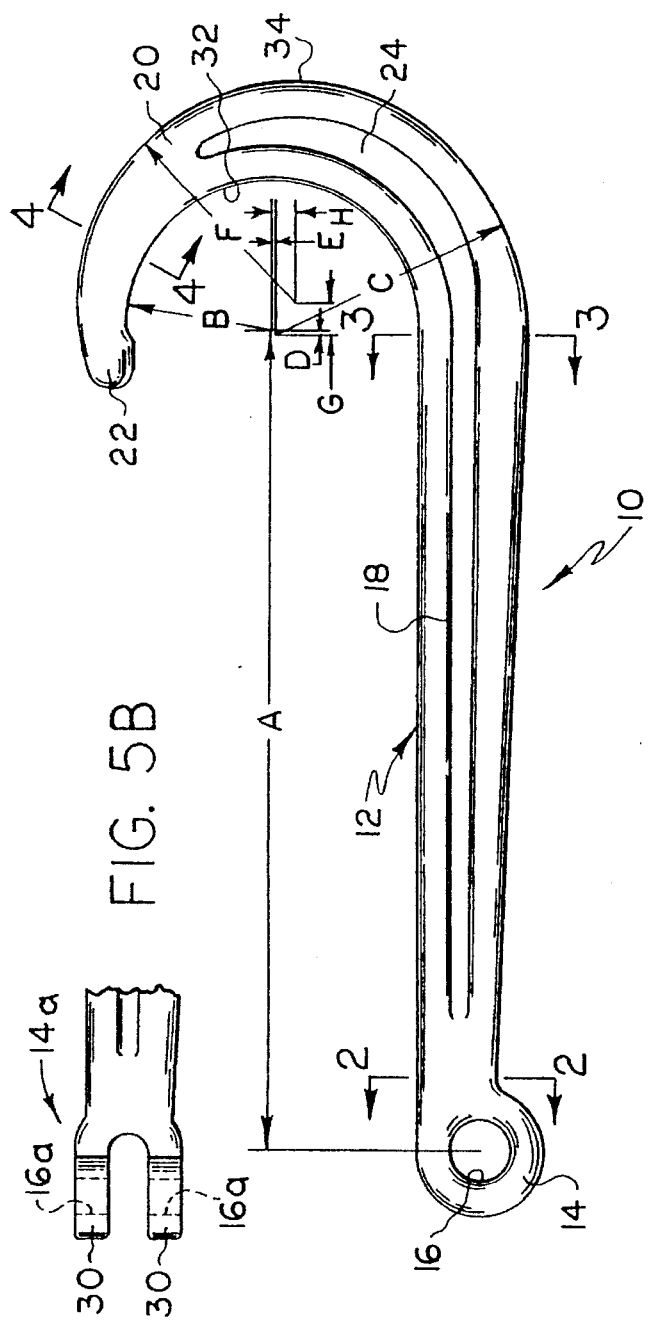
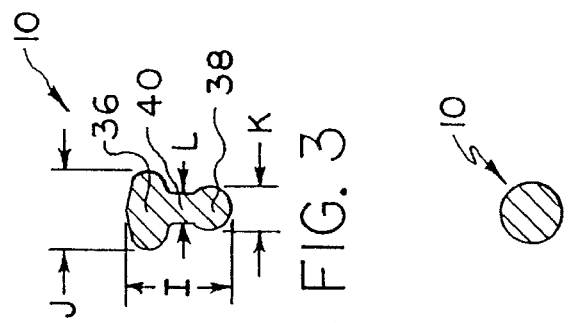
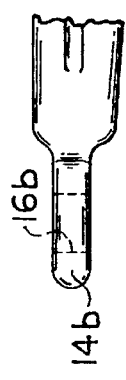
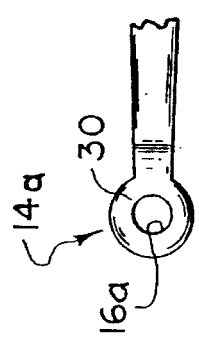

J-HOOK FOR TOWING VEHICLES

BACKGROUND OF THE INVENTION

1. Field of the Invention

The present invention relates to J-shaped hooks for carrying a load, and more particularly to a J-shaped hook for use in towing a vehicle, the hook being designed and configured to provide greatly improved strength at a light weight to withstand loading conditions associated with such Use.

2. Description of the Prior Art

J-shaped hooks, commonly referred to as "J-hooks" are well known in various applications for connecting a load to a chain or the like. J-hooks are typically used for towing vehicles, such as by coupling an eye of the J-hook to a tow chain of a recovery vehicle and connecting an arcuate portion of the J-hook to a fixed member of the vehicle to be towed or to a chain attached to such a fixed member.

Many J-hooks, such as those described in U.S. Pat. Nos. 1,459,816 and 2,646,306, are designed exclusively for generally constant vertical loading conditions associated with suspension of a load. J-hooks designed for vertical suspension loading are generally ill-suited for use in vehicle towing due to their short "reach", defined as the distance from an inner radius of an arcuate portion of the J-hook to the center of an attachment opening in an eye portion at an opposite end of the J-hook.

Common prior art J-hooks designed for the purpose of towing Vehicles have been produced by bending a suitable length of steel rod of a given diameter into the desired J shape, forming an eye portion with an attachment opening at a top end of the J, and tapering the tip of the J. J-hooks of this type have been manufactured using ⅞" diameter bar stock and have a yield strength of approximately 7,000 pounds.

U.S. Pat. No. 4,171,842 issued Oct. 23, 1979 to Tolle discloses a J-hook for towing vehicles which has a thickened elbow section to enhance the strength characteristics of the J-hook. Tests conducted by applicant indicate that the J-hook of Tolle has a minimum breaking strength, defined as the load or force at which the J-hook fails or no longer supports the load under standard testing conditions, of less than 10,000 pounds.

Prior art J-hooks for towing vehicles, including the Tolle J-hook and J-hooks of the bent steel rod variety, have a tendency to slip off of a connection member of the load vehicle or a chain attached thereto when there is slack in the tow chain, for instance when the load vehicle is being prepared for towing.

SUMMARY OF THE INVENTION

Therefore, it is an object of the present invention to provide a J-hook having improved strength characteristics when compared with prior art J-hooks.

It is a further object of the present invention to provide a lightweight J-hook of suitable reach and strength for safe use in towing a heavy vehicle.

A still further object of the present invention is to provide a J-hook with means for preventing the hook from becoming disengaged from a tow load during slackening of a tow chain connected to the hook.

The present invention is a J-hook having sufficient reach and improved strength characteristics so as to be useful in safely towing vehicles. The J-hook comprises an integrally formed body of forged micro-alloy steel having an eye portion, an elongated shank portion extending from the eye portion, and an arcuate portion extending from the shank portion to define a load bearing portion. The cross-sectional shape of the J-hook smoothly transforms into a T-shape along the shank having a maximum area maintained substantially throughout the load bearing portion. The arcuate portion of the J-hook terminates in an enlarged tip. The J-hook of the present invention is far stronger than prior art J-hooks intended for towing vehicles without any significant increase in overall weight.

BRIEF DESCRIPTION OF THE DRAWINGS

The nature and mode of operation of the present invention will now be more fully described in the following detailed description taken with the accompanying drawings wherein:

FIG. 1 is a side elevational view of a J-hook formed in accordance with the present invention;

FIG. 2 is a sectional view thereof taken generally along line 2—2 in FIG. 1;

FIG. 3 is a sectional view thereof taken generally along line 3—3 in FIG. 1;

FIG. 4 is a sectional view thereof taken generally along line 4—4 in FIG. 1;

FIGS. 5A and 5B are front and side partial views, respectively, showing a clevis type eye portion of an alternative embodiment J-hook;

FIGS. 6A and 6B are front and side partial views, respectively, showing a rotated type eye portion of an alternative embodiment J-hook;

DETAILED DESCRIPTION

Figure 7:
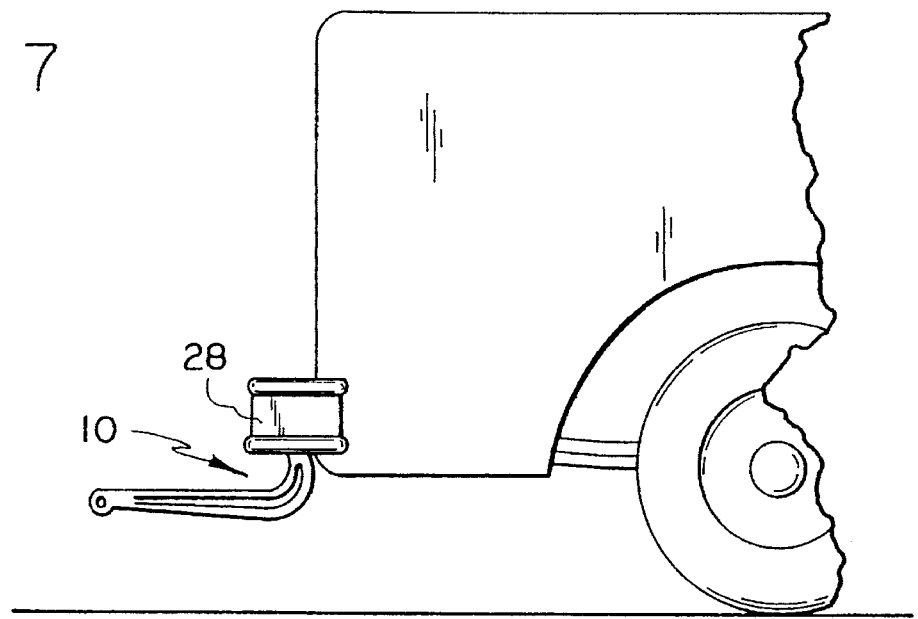
FIG. 7 is a view illustrating a J-hook of the present invention connected to a bumper of a vehicle to be towed.

A J-hook formed in accordance with the present invention is depicted in FIG. 1 and generally designated as 10. J-hook 10 is conventional in that it includes a solid, integrally formed body 12 having an annular eye portion 14 defining an attachment opening 16 therethrough, an elongated shank portion 18, and an arcuate portion 20 terminating in a tip 22.

As illustrated in FIG. 2, shank portion 18 has an oblong cross-section at a location adjacent eye portion 14. Progressing along shank portion 18 in a direction from eye portion 14 to arcuate portion 20, the cross-sectional shape of the shank portion smoothly transforms into a T-shape of gradually growing area. At a location defining the junction between shank portion 18 and arcuate portion 20, shown in FIG. 3, the T-shaped cross section reaches its maximum area. This maximum cross-sectional area is substantially maintained through a load bearing portion 24 of J-hook 10 defined by arcuate portion 20. Travelling along arcuate portion 20 from load bearing portion 24 toward tip 22, the cross sectional area diminishes and the cross sectional shape smoothly transforms from a T-shape to a circle, as shown in FIG. 4.

Figure 8:
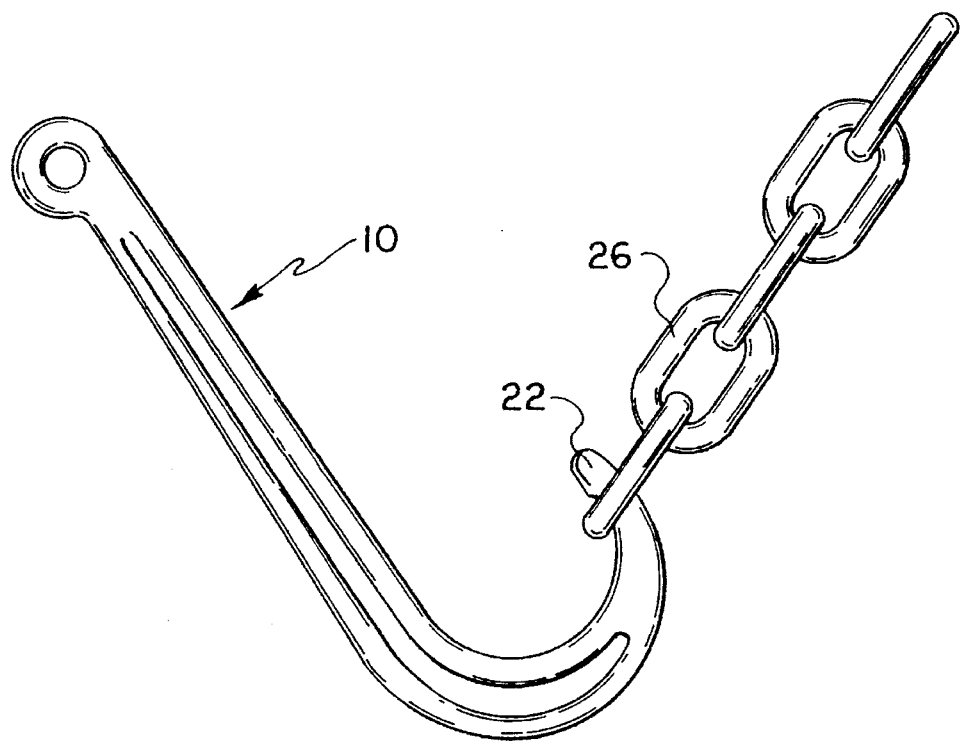
FIG. 8 is a view illustrating a J-hook of the present invention connected to a chain load.

Tip 22 is preferably of an enlarged configuration for preventing J-hook 10 from slipping off of a load. FIG. 8 shows enlarged tip 22 engaging a link of a load chain 26 to prevent J-hook 10 and load chain 26 from becoming disconnected. Referring to FIG. 7, an enlarged tip 22 also diminishes the risk of deforming the shape of a bumper 28 to which J-hook 10 may be connected by distributing load force over a greater surface area of the bumper at the point of contact than prior art J-hooks.

As illustrated in FIGS. 5A,5B and 6A,6B, alternative embodiments of J-hook 10 are possible within the scope of the present invention. More particularly, J-hook 10 may be provided with a clevis type eye portion, designated as 14a in FIGS. 5A,5B, having a pair of annular prongs 30,30 defining coaxial attachment openings 16a,16a. In a further embodiment shown in FIGS. 6A,6B, a rotated type annular eye portion 14b defines an attachment opening 16b having an axis rotated 90 degrees about a longitudinal axis of the J-hook with respect to the axis of attachment opening 16 shown in FIG. 1.

Dimensional specifications for a preferred embodiment of J-hook 10 are listed in Table 1 below with reference to letters appearing in FIGS. 1 and 3. As may be understood from FIG. 1, arcuate portion 20 includes an inner curve 32 of a constant radius B and an outer curve 34 composed of a pair of radii C and F having centers which are offset from the center of the inner curve radius B. The T-shaped cross section extending through load bearing portion 24 includes an oblong transverse region 36 associated with inner curve 32 and a circular base region 38 associated with outer curve 34. Transverse region 36 and base region 32 are connected by a rectangular region 40 having a width L that is less than the diameter K of the base region.

TABLE 1

| Dimension | Distance in Inches |
|---|---|
| A | 10.531 |
| B | 1.875 |
| C | 3.191 |
| D | 0.034 |
| E | 0.052 |
| F | 2.764 |
| G | 0.383 |
| H | 0.298 |
| I | 1.375 |
| J | 1.000 |
| K | 0.500 |
| L | 0.375 |

Body 12 is preferably forged using a micro-alloy steel known as "Micro-Tuff 10" available from Chaparral Steel located in Midlothian, Tex. This steel is heat treated by water quenching at its transformation temperature, such that it exhibits a yield strength of 150,000 PSI and a tensile strength of 180,000 PSI. Tests indicate that for the preferred embodiment described herein, a yield strength of approximately 25,000 pounds is achieved, far in excess of the yield strength of any prior art J-hook known to applicant and configured for use in towing vehicles. The minimum breaking strength of the preferred embodiment J-hook exceeds 18,000 pounds.

The forged J-hook of the present invention is designed to withstand sporadic, generally horizontal loading resulting from intermittent slackening and tightening of a tow chain attached thereto during a towing operation, without being bulky and heavy. In this regard, the preferred embodiment J-hook has a reach greater than 12 inches, a maximum cross-sectional area as shown in FIG. 3 less than 0.80 square inches, and an overall weight less than 3.5 pounds.

What is claimed is:

1. A J-shaped hook for towing vehicles, said hook comprising:

a solid integrally formed body including an eye portion having an attachment opening therethrough, a straight elongated shank portion extending from said eye portion in a direction of loading, and an arcuate portion extending from said shank portion to define a load bearing portion, said arcuate portion terminating in a tip;

said shank portion having an oblong cross section adjacent said eye portion, said oblong cross section smoothly transforming into a generally T-shaped cross section in a direction toward said arcuate portion, and said T-shaped cross section increasing in area to a maximum area at a location where said shank portion and said arcuate portion meet; and said arcuate portion having said T-shaped cross section throughout said load bearing portion, said T-shaped cross section smoothly transforming into a circular cross section approaching said tip, and said maximum area of said T-shaped cross section being substantially maintained through said load bearing portion.

2. The J-shaped hook according to claim 1, wherein said arcuate portion includes an inner curve and an outer curve, and said T-shaped cross section includes an oblong transverse region associated with said inner curve and a circular base region associated with said outer curve, said transverse region and base region being connected by a rectangular region having a width less than the diameter of said circular base region.

3. The J-shaped hook according to claim 2, wherein said inner curve has a constant radius and center point, and said hook has a reach at least as great as six times said inner curve radius.

4. The J-shaped hook according to claim 1, wherein said hook has a reach of at least 12 inches, said maximum area is less than 0.80 square inches and said hook weighs no more than 3.5 pounds.

5. The J-shaped hook according to claim 4, wherein said tip is enlarged.

6. The J-shaped hook according to claim 4, wherein said eye portion defines a clevis.

\* \* \* \* \*